April 1, 1958 J. F. CIBULA, SR 2,828,854
BELT ALIGNERS
Filed May 5, 1955 2 Sheets-Sheet 1
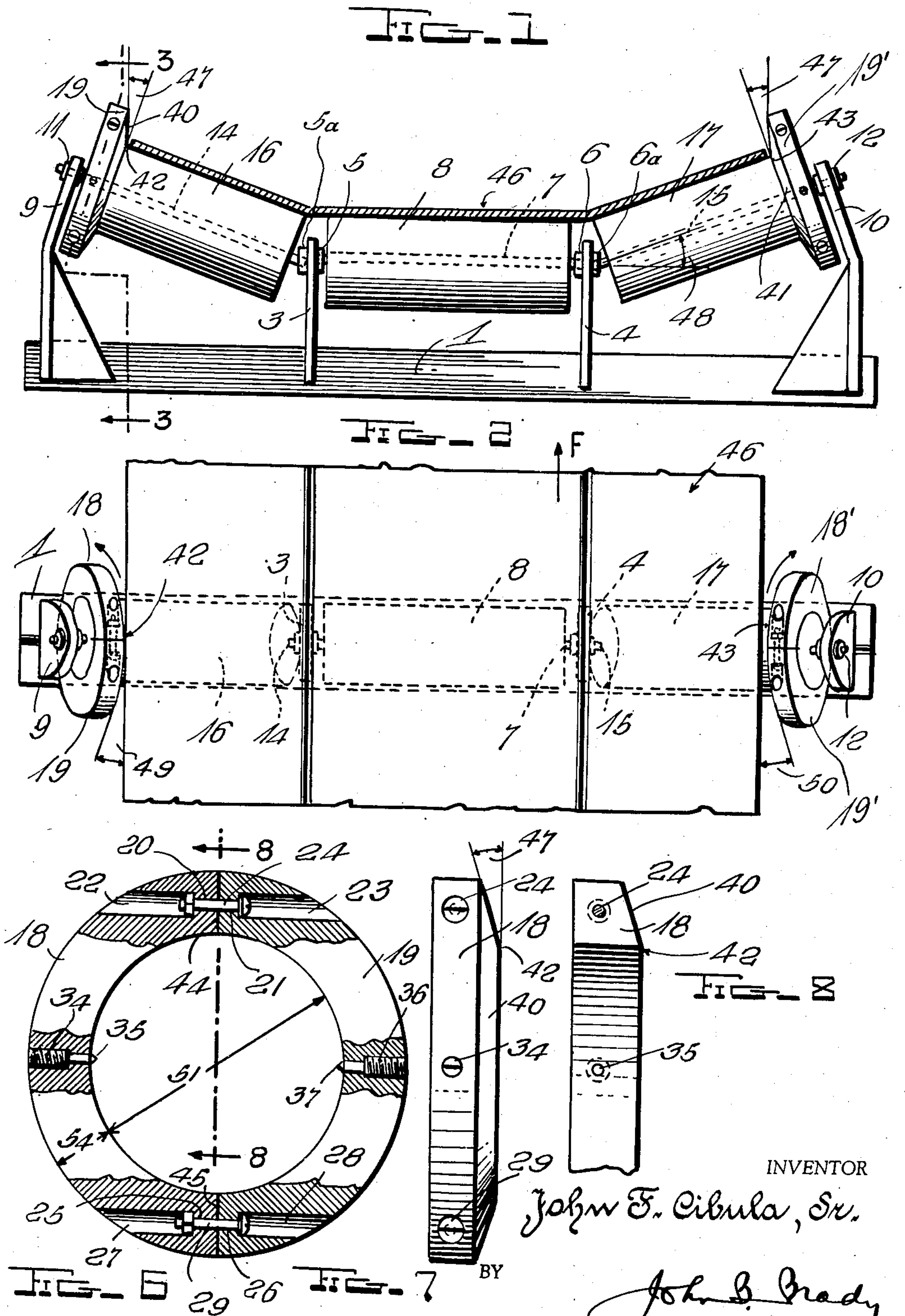
INVENTOR
John F. Cibula, Sr.
BY
John B. Brady
ATTORNEY April 1, 1958 J. F. CIBULA, SR 2,828,854
BELT ALIGNERS
Filed May 5, 1955 2 Sheets-Sheet 2
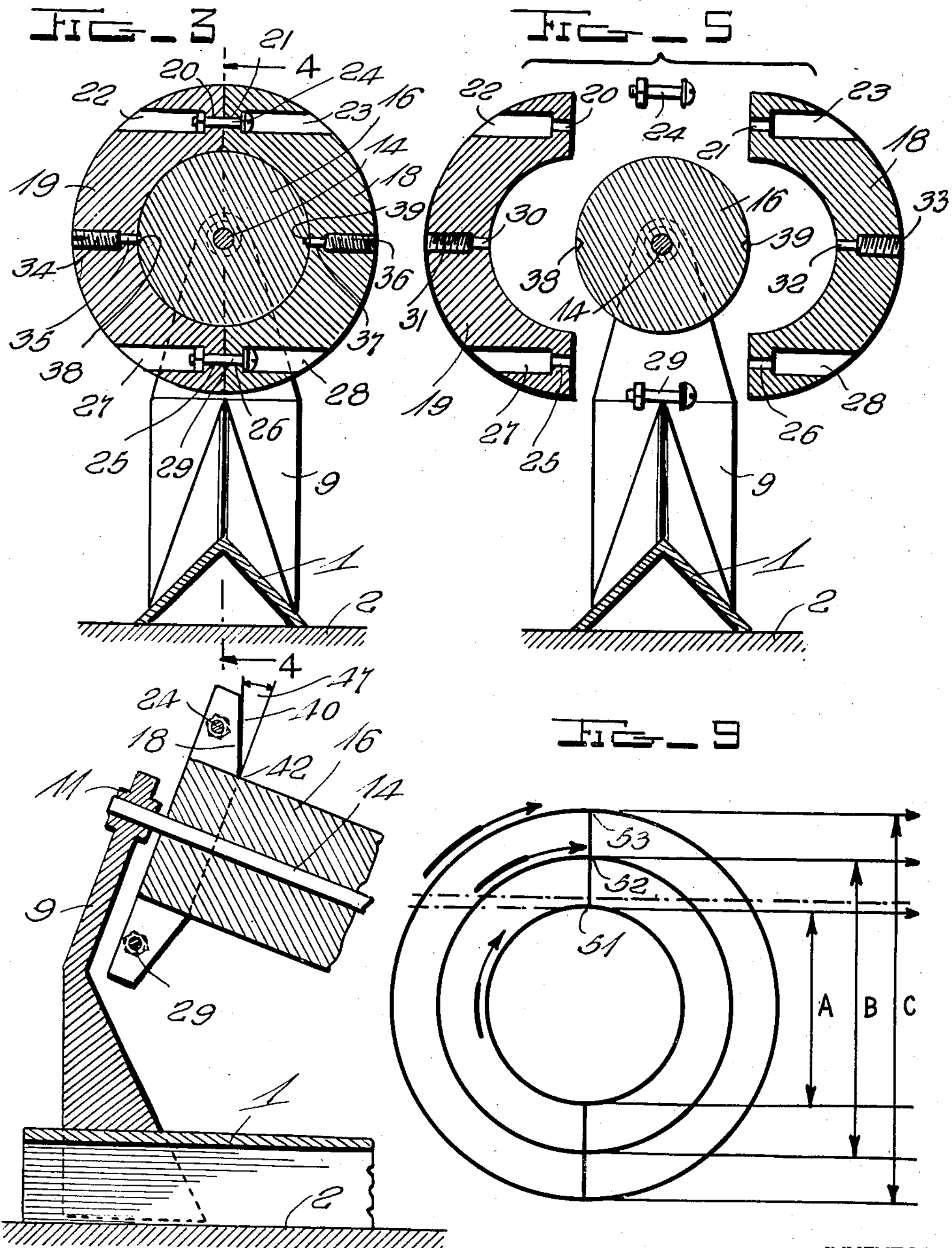
INVENTOR
John F. Cibula, Sr.
BY
John B. Brady
ATTORNEY

United States Patent Office 2,828,854

Patented Apr. 1, 1958

1

2,828,854

BELT ALIGNERS

John F. Cibula, Sr., Lancaster, Pa.

Application May 5, 1955, Serial No. 506,171

7 Claims. (Cl. 198—202)

My invention relates broadly to endless conveyers and more particularly to an aligner for belts or conveyers for maintaining the belt or conveyer in a confined path of travel.

One of the objects of my invention is to provide an efficient and economical construction of aligner for endless belts or conveyers by which such belts or conveyers are restricted in a confined path of movement over idler rolls and prevented from running over the edges of the idler rolls with the incidental entanglement with the idler roll brackets, whereby the belt or conveyer is prevented from engaging or riding upon the sharp peripheral edges of the idler rolls.

Another object of my invention is to provide a construction of aligner for belts and conveyers where the aligner is constructed in a multiplicity of sections which may be assembled about the idler roll for forming a confining flange on the end of the idler roll for maintaining the edge of the belt or conveyer in a predetermined path and eliminating wear and stress along the edge of the conveyer, resulting in contact with the sharp peripheral edge of the idler roll or the supporting brackets in which the roll is journalled.

Another object of my invention is to provide a construction of aligner for application to the end of an idler roll of a belt conveyer installation where the aligner is formed by a pair of semi-circular ring members which may be assembled from opposite sides of the roll and clamped by means of bolts extending along chords through the abutting ends of the semi-circular ring members for effecting assembly and disassembly of the aligners with respect to the roll without removal of the roll from its journal or end bearing.

Still another object of my invention is to provide a construction of belt or conveyer aligner which may be applied over the peripheral surface of an idler roll consisting of semi-circular ring members having coacting semi-circular faces which are inclined at an angle of approximately 20° in the direction of the surface of the roll and where the ring members are secured in end-to-end abutment around the roll, the inclined face of the semi-circular ring members forming an annular guide for confining the peripheral edge of belt or conveyer operative over the cylindrical surface of the roll, the inclined face on the coacting ring members tending to center the belt or conveyer with respect to an assembly of rolls over which the belt or conveyer operates.

Other and further objects of my invention reside in the construction of a belt or conveyer aligner which may be assembled with respect to idler rolls without disturbing the installation of the rolls on their shafts in a belt conveyer system as set forth more fully in the specification hereinafter following by reference to the accompanying drawings, in which:

Fig. 1 is a transverse sectional view through a belt conveyer system showing the installation of the belt aligners of my invention;

2

Fig. 2 is a fragmentary plan view of one set of idler rolls extending transversely of a belt conveyer system and showing the belt aligners of my invention installed on the two opposite outside rolls;

Fig. 3 is a vertical sectional view taken substantially on line 3—3 of Fig. 1 through one of the belt aligner assemblies of my invention;

Fig. 4 is a fragmentary longitudinal sectional view taken through one of the idler rolls and the bracket mounting therefor and illustrating one of the semi-circular ring members constituting part of the belt aligner assembled in relation to the end of the idler roll;

Fig. 5 is a view similar to the view shown in Fig. 3 but illustrating the semi-circular ring members of the belt aligner removed in spaced positions on opposite sides of the idler roll and showing the fastening bolts in juxtaopposed positions;

Fig. 6 is an end elevational view of the belt aligner assembly of my invention, with parts of the semi-circular ring members constituting the belt aligner broken away and illustrated in section to illustrate the diametrical aligning means and the fastening means associated with the semi-circular ring members of the aligner assembly;

Fig. 7 is a side elevational view of the aligner assembly shown in Fig. 6;

Fig. 8 is a fragmentary elevational view of one of the ring members forming part of the belt aligner of my invention, the view looking in the direction of line 8—8 of Fig. 6; and Fig. 9 is a theoretical view showing the manner in which the peripheral edge of the belt or conveyer may shift with respect to the inclined face of the coacting ring members forming the belt aligner assembly of my invention.

My invention is directed to a belt aligner assembly for application to large installations of conveyer belts where conveyer belts operate progressively over spaced idler rolls for carrying heavy materials, such as crushed stone, sand and gravel, coal, ore, and other granular products. In conveying material of this kind the conveyer belt, while of tough material, nevertheless, often tends to overrun the mounting brackets at opposite sides of the path of the conveyer system, subjecting the underside of the belt to cutting, abrasion, and wear from the peripheral edge of the outer idler roll, often resulting in the shutting down of the conveyer system for repair and replacement.

Maintenance costs on a belt conveyer system may be quite high and the aligner of my invention has been developed for application to the idler roll for maintaining the path of travel of the belt or conveyer and preventing shifting of the belt out of the prescribed path. The belt aligner of my invention is not an integral part of the idler roll but is attachable thereto to form an end confining flange. The belt aligner comprises a multiplicity of ring-like sections which are interconnected at their opposite ends by means streamlined within the sections and which offer no obstruction in the rotation of the idler roll for entanglement with the conveyer. It is unnecessary to remove or disassemble the idler rolls with respect to their journals or bearings as the ring-like sections of the aligner are clamped around the periphery of the roll while the roll is mounted in its bearings or journals. The ring-like sections of the aligner are provided with adjustable screws having tapered points thereon and carried in diametrically opposite positions with respect to the roll. The tapered points of the adjustable screws enter diametrically opposite recesses formed in the surface of the roll. The ends of the ring-like sections are interconnected by bolt members which are chordal to the assembled aligner and with their opposite ends wholly embedded within the aligner. The ring-like sections of the aligner assembly have an end face which is angularly inclined in the direction of the surface of the roll. This end face is disposed at an angle of approximately 20° to the surface of the roll and serves as a guiding or confining face against which the edge of the moving belt establishes contact in the course of its movement. I have found this 20° angle critical in enabling the opposite aligners to center or maintain a moving belt conveyer in a predetermined course with respect to the idler rolls. Also, the inclined faces of the aligner are related to the opposite edges of the belt conveyer in the direction of the path of movement thereof so that as the belt tends to climb the surface of one belt aligner and recede from the surface of the opposite belt aligner the inclined face against which the moving belt tends to shift, operates to direct the belt back into its central path of movement. The belt is realigned by frictional forces transferred from the face of the aligner to the edge of the moving belt to compensate for forces developed at the edge of the belt, as the belt tends to run off the idlers. The increase in friction due to the higher speed of the uppermost part or larger diameter portion of the aligner forces the belt back into central position if the belt conveyer moves out of alignment any substantial distance. This arrangement enables conveyer belts to be operated efficiently on a slight curve by installing more idlers which are more closely spaced. I have also found that the aligners when installed as flanges at the ends of the idler rolls also assist in preventing the conveyer belt from being blown off the idler rolls in installations which are subject to high winds.

Referring to the drawings in more detail, reference character 1 designates a transverse support of angular section forming part of the belt conveyer installation. The transverse support 1 is mounted on a suitable frame which I have designated in Figs. 3–5 at 2. Each transverse support 1 carries vertically disposed intermediate brackets 3 and 4 spaced one from the other. The brackets 3 and 4 carry journals 5 and 6 in their upper end, the journals having angular external extensions **5*a* and 6*a*. A horizontally extending transverse shaft 7 is mounted in journals 5 and 6 and supports the intermediate idler roll or drum 8 thereon, for rotation between journals 5 and 6, in intermediate brackets 3 and 4**.

End brackets 9 and 10 are carried by the transverse support 1 and provide mounting means for journals 11 and 12. The brackets 9 and 10 are inclined toward each other and journals 11 and 12 therein are disposed on axes directed toward the angular external journal extensions **5*a* and 6*a*. Rotary shafts 14 and 15 are mounted for rotation between journal 11 and journal extension 5*a*; and between journal 12 and journal extension 6*a*. The rotary shafts 14 and 15 carry idler rolls or drums 16 and 17 angularly disposed on opposite sides of idler drum 8 and coacting to support the conveyer belt 46. The roll or drum 16 is provided with belt aligner 18—19 on the end thereof. The belt aligner 18—19 is constituted by multiple circular sections and in the particular sample shown these sections are constituted by two semi-circular ring members shown more clearly in Figs. 3–8. The two semi-circular ring members 18 and 19 form a cylindrical peripheral face and an angularly inclined or tapered face and are fastened together in end-to-end abutment along lines 44 and 45 by bolts 24 and 29. Bolt 24 passes through aligned holes 20 and 21 and counterbores 22 and 23 as shown more clearly in Fig. 6. Bolt 29 passes through aligned holes 25 and 26 and counterbores 27 and 28. The semi-circular ring member 18 is provided with a radially disposed hole 30 centrally of the semi-cylindrical peripheral face thereof which extends into the screw threaded recess 31. The semi-circular ring member 18 is provided with a radially extending centrally disposed hole 32 in the semi-cylindrical peripheral face thereof extending into the screw threaded recess 33. The holes 30—31 and recesses 32—33 are aligned with a diametrical line through the central axis of roll 16. The screw threaded recess 31 and contiguous radially extending hole 30 receive the adjustable set screw and pin 34—35 shown more clearly in Figs. 3 and 6. The semi-circular ring member 18 receives the opposite set screw 36 with contiguous pin 37 connected therewith. The pins 35 and 37 are of reduced section compared to the section of the set screws 34 and 36 and extend through radially disposed holes 30 and 32 in the semi-cylindrical peripheral faces of the semi-circular ring members 19 and 18 and enter the diametrically opposite recesses 38 and 39 formed in the surface of the roll or drum 16 as shown more clearly in Figs. 3 and 5. Thus, the aligner assembly is mounted as a flange adjacent the end of the roll or drum 16 and adjacent the end of the drum 17 as shown more clearly in Figs. 1 and 2. Each aligner assembly includes an inclined or tapered face 40 and 41 which is angularly inclined at approximately 20° to the surface of the drums 16 and 17. The opposite edges of the conveyer belt 46 establish a line of contact 42 with inclined or tapered face 40 of aligner assembly 18—19, and at 43 with inclined or tapered face 41 of the opposite aligner assembly. I have designated these angles at 47. This is the same angle as the angle 48 illustrated in Fig. 1, that is, the angle between the axis of shaft 7 of roll 8 and the axis of shaft 15 of roll 17. The angle which the opposite edges of the conveyer belt 46 makes with respect to inclined or tapered face 40 of the aligner assembly 18—19 is indicated at 49 in Fig. 2 while the angle which the opposite edge of the conveyer belt 46 makes with respect to the inclined or tapered face 41 of the opposite aligner assembly constituted by semi-circular ring members 18' and 19' is indicated at 50. As the conveyer belt moves, angles 49 and 50** may vary and the aligner arrangement of my invention operates to maintain these angles symmetrical.

In Fig. 9 I have shown various conditions which exist as the belt travels in direction F (Fig. 2). The belt travels in its normal position on the diameter 51 of the opposite belt aligner assemblies, with the opposite parts of the belt traveling through the distance A. This can be thought of as the normal speed of the belt in feet per minute. Therefore, if the belt runs normally without attempting to run off of the rolls, the aligner will consequently hit the belt at approximately normal speed. Under unforeseen circumstances the belt may be displaced so that it tends to travel in different positions through the distance 54 on the belt aligner. This may be, for example, the path 52 with the spatial distance B between opposite portions of the belt represented in Fig. 9. If conditions prevail which force the belt to get out of line and climb the inclined or tapered surface 40 or 41 to another position the belt may assume the position 53, indicated in Fig. 9, with the spaced parts of the belt separated as represented at C. This is also a condition dependent upon speed and the speed of surface points at the position 53 will be greater than points at positions 51 and 52, and such points on the inclined or tapered surfaces 40 or 41 will strike the belt at a greater impact causing an increase in friction and forcing the belt back into proper normal position with a downward motion and at an angle of 20°, at 49 or 50 (Fig. 2).

The semi-circular ring members may be formed from metal, rubber, fiber or plastic, and inasmuch as they are applicable to the rolls or drums without disassembly of the journal or bearing assemblies the aligners of my invention are made readily applicable to existing belt or conveyer installations.

While I have described my invention in certain preferred embodiments I realize that modifications may be made, and I desire that it be understood that no limitations upon my invention are intended other than may be imposed by the scope of the appended claims.

What I claim as new and desire to secure by Letters Patent of the United States is as follows:

1. An aligner for conveyer belts comprising a pair of semi-circular ring members adapted to fit around the end surface of a cylindrical roll, said ring members each having a semi-cylindrical peripheral face and a tapered face extending therefrom, said semi-cylindrical peripheral face having adjustable screws arranged radially therein adjacent the centers of the ring members and adjustable to enter recesses in the roll and fastening means mutually connecting the ends of said ring members for embracing said roll.

2. An aligner for conveyer belts as set forth in claim 1 in which the tapered faces of the ring members adjacent the cylindrical surface of said roll are inclined from one edge of the cylindrical peripheral faces of the ring members in a direction toward the surface of the roll for guiding and confining an edge of a conveyer belt operative over the cylindrical surface of the roll.

3. An aligner for conveyer belts as set forth in claim 1 in which said fastening means consist of bolt members extending through the semi-cylindrical peripheral faces of said semi-circular ring members on axes which are chordal to the circular periphery of said ring members.

4. An aligner for conveyer belts as set forth in claim 1 in which the tapered faces of said ring members adjacent the cylindrical surface of said roll are inclined from one edge of the cylindrical peripheral faces of the ring members at an angle of approximately 20° in the direction of the surface of the roll for guiding and confining the edge of a conveyer belt operative over the cylindrical surface of the roll.

5. An aligner for conveyer belts as set forth in claim 1 in which said adjustable screws are wholly embedded within the limits of the semi-cylindrical peripheral surfaces of said semi-circular ring members and each include sections having a tapered point thereon for entering the roll.

6. An aligner for conveyer belts as set forth in claim 1 in which said fastening means are wholly embedded within the limits of the semi-cylindrical peripheral surfaces of said semi-circular ring members.

7. An aligner for conveyor belts comprising a multiplicity of coacting curved sections each having a portion constituting a cylindrical surface and a coacting portion constituting a tapered surface adapted to be assembled and secured about the periphery of one end of a cylindrical drum for forming a guiding and confining means for the edge of a conveyer belt, abutment faces formed on the ends of said sections for establishing flat end-to-end abutments between said sections and means passing through the portions of said sections constituting a cylindrical surface and through said abutment faces and extending chordal with respect to the assembled coacting curved sections for maintaining said sections in assembled poisition around the surface of said drum the tapered surface of said sections forming angularly disposed guiding and confining contiguous faces formed on said curved sections for engaging and guiding the edge of a conveyor belt.

References Cited in the file of this patent

UNITED STATES PATENTS

| | | |
|---|---|---|
| 443,269 | Coddington | Dec. 23, 1890 |
| 1,705,558 | Cuddihy | Mar. 19, 1929 |
| 2,109,925 | Mitchell | Mar. 1, 1938 |
| 2,473,599 | Liebel | June 21, 1949 |
| 2,570,364 | Mercier | Oct. 9, 1951 |
| 2,614,434 | Pavlak | Oct. 21, 1952 |